US011074398B2

(12) United States Patent
Liu et al.

(10) Patent No.: US 11,074,398 B2
(45) Date of Patent: Jul. 27, 2021

(54) TRACKING AND MANAGING EMOJI ANNOTATIONS

(71) Applicant: International Business Machines Corporation, Armonk, NY (US)

(72) Inventors: Su Liu, Austin, TX (US); Eric Rozner, Austin, TX (US); Inseok Hwang, Austin, TX (US); Jinho Lee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/126,707

(22) Filed: Oct. 12, 2018

(65) Prior Publication Data

US 2020/0117707 A1 Apr. 16, 2020

(51) Int. Cl.
*G06F 40/169* (2020.01)
*G06F 3/0481* (2013.01)
*G06F 16/23* (2019.01)
*G06F 40/58* (2020.01)

(52) U.S. Cl.
CPC ........ *G06F 40/169* (2020.01); *G06F 3/04817* (2013.01); *G06F 16/2365* (2019.01); *G06F 40/58* (2020.01)

(58) Field of Classification Search
CPC .............................. G06F 17/00; G06F 40/169
See application file for complete search history.

(56) References Cited

U.S. PATENT DOCUMENTS

| 9,665,567 | B2 | 5/2017 | Liu et al. | |
|---|---|---|---|---|
| 2005/0156873 | A1* | 7/2005 | Walter et al. | G09G 5/00 |
| 2013/0173727 | A1* | 7/2013 | Libin et al. | H04L 12/584 |
| 2014/0303964 | A1 | 10/2014 | Kennard et al. | |
| 2016/0004413 | A1* | 1/2016 | Leydon et al. | G06F 3/04842 |
| 2017/0052946 | A1* | 2/2017 | Gu et al. | G06F 17/279 |
| 2017/0083491 | A1 | 3/2017 | Kumhyr et al. | |

(Continued)

FOREIGN PATENT DOCUMENTS

WO 2017195992 A1 11/2017

OTHER PUBLICATIONS

Zhao et al., "Analyzing and Predicting Emoji Usages in Social Media", Apr. 23-27, 2018, ACM, pp. 327-334 (Year: 2018).*

*Primary Examiner* — James J Debrow
(74) *Attorney, Agent, or Firm* — Kunzler Bean & Adamson

(57) ABSTRACT

A first method includes identifying a potential emoji annotation for a selected context within a text source, validating the potential emoji, determining whether the validated emoji annotation is within an emoji annotation list for the selected context, and adding the validated emoji annotation to the emoji annotation list for the selected context responsive to determining that the validated emoji annotation is not within the emoji annotation list for the selected context. A second method includes adding an emoji annotation written in a first language to an emoji annotation list corresponding to the first language, translating the emoji annotation written in the first language to a second language to produce an emoji annotation written in the second language, and adding the emoji annotation written in the second language to an emoji annotation list corresponding to the second language. Corresponding apparatii, computer program products and computer systems are also disclosed herein.

15 Claims, 6 Drawing Sheets

(56) References Cited

U.S. PATENT DOCUMENTS

| | | |
|---|---|---|
| 2017/0177554 A1 | 6/2017 | Emmons et al. |
| 2017/0308267 A1 | 10/2017 | Kozloski et al. |
| 2018/0260385 A1* | 9/2018 | Fan et al. ............... G06F 17/27 |
| 2018/0336184 A1* | 11/2018 | Bellegarda et al. .... G06F 17/27 |
| 2018/0373683 A1* | 12/2018 | Hullette et al. ..... G06F 17/2235 |

* cited by examiner

TRACKING AND MANAGING EMOJI ANNOTATIONS

BACKGROUND

The subject matter disclosed herein relates generally to text-based communications and specifically to managing emoji annotations for text-based communications.

"Emoji" is a Japanese word for pictograph that is used in many languages to describe graphical symbols that are electronically stored and transmitted as character (e.g., Unicode) codes. Emoji characters are often are sent in messages between users as an efficient and entertaining form of communication. Emoji annotations are text-based descriptions of the intended meaning of emoji characters. Emoji annotations are often provided as supplementary information to text-based communication to facilitate text-to-speech conversion, natural language processing, sentiment analysis, and/or translation.

SUMMARY OF THE INVENTION

A first method for dynamically building an emoji annotation list includes identifying a potential emoji annotation for a selected context within a text source, validating the potential emoji annotation to provide a validated emoji annotation, determining whether the validated emoji annotation is within an emoji annotation list for the selected context, and adding the validated emoji annotation to the emoji annotation list for the selected context responsive to determining that the validated emoji annotation is not within the emoji annotation list for the selected context. The selected context may correspond to one or more of a language, a dialect, a locale, a culture, a user profile, a user affiliation and a geographic region. A corresponding apparatus, computer program product and system are also disclosed herein.

A second method for dynamically building an emoji annotation list includes adding an emoji annotation written in a first language to an emoji annotation list corresponding to the first language, translating the emoji annotation written in the first language to a second language to produce an emoji annotation written in the second language, and adding the emoji annotation written in the second language to an emoji annotation list corresponding to the second language. A corresponding apparatus, computer program product and system are also disclosed herein.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

One of skill in the art will appreciate that references throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The embodiments disclosed herein recognize that various vendors and system providers provide slightly different graphical symbols for the same emoji character code and that interpretation of the meaning of those symbols by users is highly dependent on the context of the conversation including the language, culture, geographic region, socio-economic backgrounds, affiliations and even personalities of the users that send, receive and interpret the graphical symbols. Consequently, emoji annotations should reflect the wide variety of contexts in which emoji characters are used for communication. The embodiments disclosed herein also recognize that emoji annotations can often be extracted or derived from the text-based messages in which they are embedded. Furthermore, given that there are currently at least 270 languages in which emoji characters are used and at least 800 emoji characters in use, it is recognized that distributed dynamic management of emoji annotations may be preferred over centralized (e.g., manual) registration of annotations.

Figure 1A:
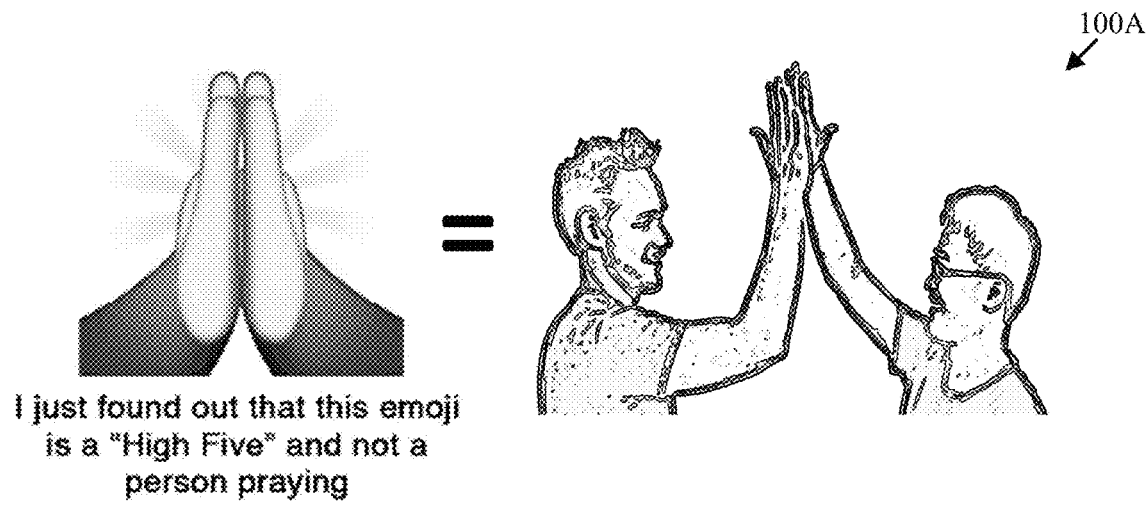
FIGS. 1A and 1B are graphic illustrations of examples of the conveyed meaning of an emoji character in two different contexts.
Figure 1B:
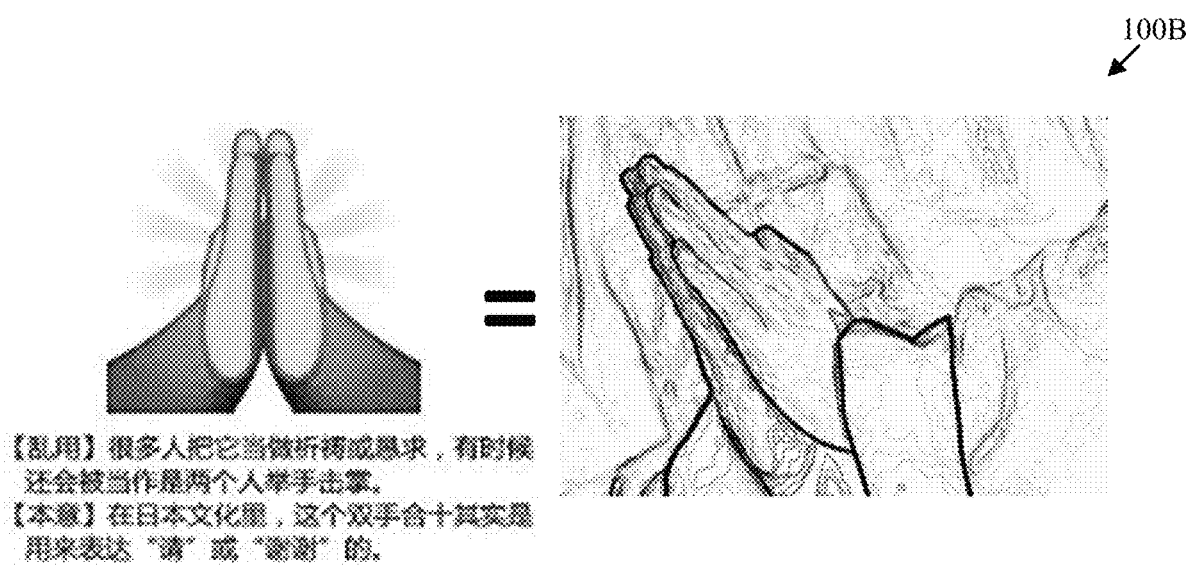

FIGS. 1A and 1B are graphic illustrations of examples of the conveyed meaning of an emoji character, Unicode Character "🙏" (U+1F64F, Person with Folded Hands), in two different contexts. In a first context corresponding to a first language, namely US English, the conveyed meaning of the depicted graphical symbol is intended to be "congratulations" or "way to go" corresponding to a "high five" gesture extended to a party being congratulated. In another context corresponding to a second language, namely Standard Mandarin, the conveyed meaning of the depicted graphical symbol is often intended to be "please" or "pray" corresponding to a person praying. However, in the original Japanese, the emoji character typically corresponds to an expression of gratitude. Consequently, the conveyed meaning of the depicted emoji character is highly dependent on context.

Figure 2:
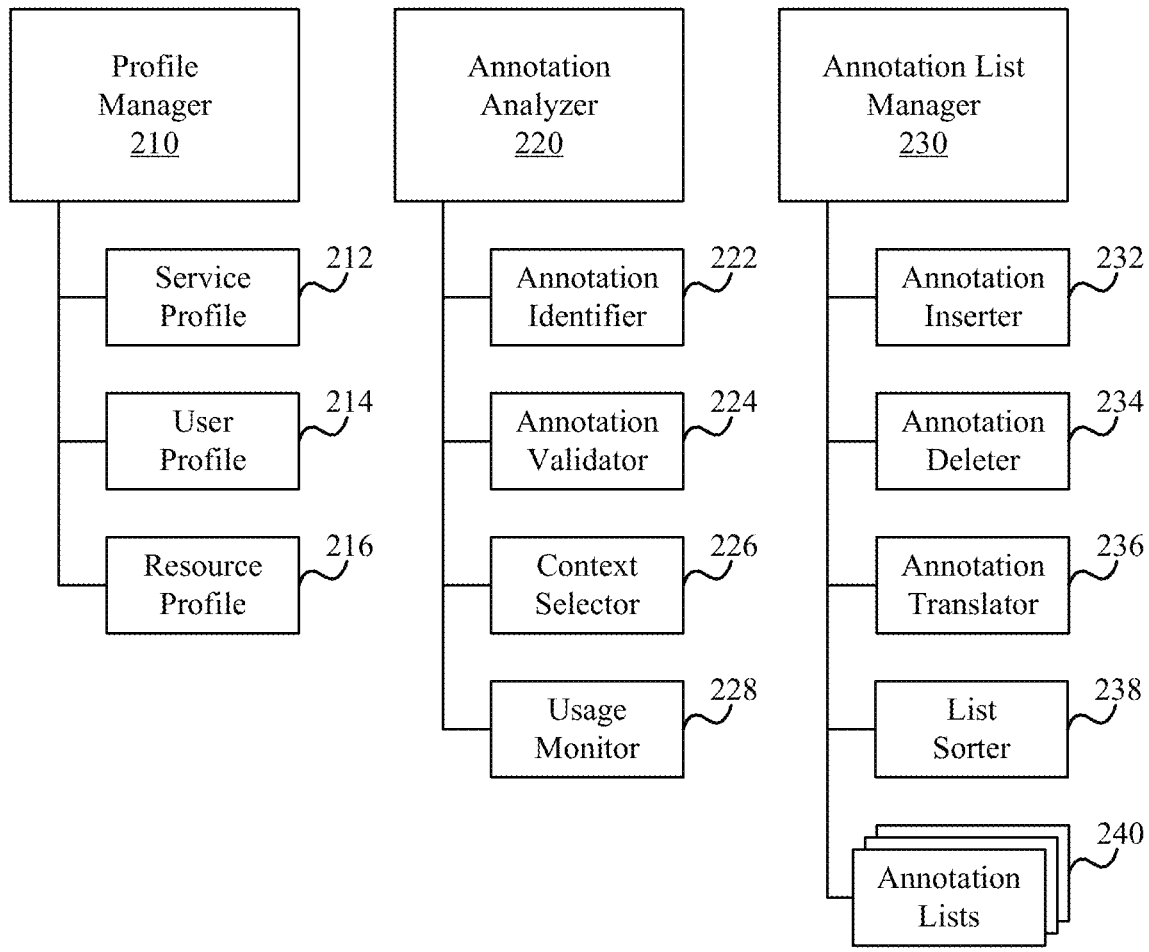
FIG. 2 is a block diagram of one example of an emoji annotation tracking apparatus in accordance with at least one embodiment disclosed herein.

FIG. 2 is a block diagram of one example of an emoji annotation tracking apparatus 200. As depicted, the emoji annotation tracking apparatus 200 includes a variety of modules including a profile manager 210, an annotation analyzer 220, an annotation list manager 230 and annotation lists 240. The emoji annotation tracking apparatus 200 enables tracking and management of annotations corresponding to emoji characters used in multiple contexts such as contexts based on one or more of language, locale, region, user affiliations, user skills and user interests.

The profile manager 210 manages profile information that is relevant to tracking and managing emoji annotations such as resource information, communication services information, user information and group information. In the depicted embodiment, the profile manager 210 manages a service profile 212, a user profile 214, and a resource profile 216. However, one of skill in the art will appreciate that a variety of profiles may be managed by the profile manager 210 and leveraged by the emoji annotation tracking apparatus 200.

The service profile 212 may indicate characteristics of the service used by the user for communication including a default or preferred context for the service. The user profile 214 may indicate characteristics of the user including preferences, skills, background information and affiliations. The resource profile 216 may indicate or refer to multiple Emoji standards/resources useful for managing annotations such as Unicode.org, emojipedia, wikipedia, vendor standards, or local government standards.

The modules of the depicted annotation analyzer 220 include an annotation identifier 222, an annotation validator 224, a context selector 226, and a usage monitor 228. The annotation identifier 222 may identify potential annotations with a text source such as a text message, instant message, social media comment, email or the like. Activation of the annotation identifier 222 may be triggered by the presence of one or more emoji characters within the text source. The annotations may be extracted from, or derived from, the text source via semantic analysis or some other form of artificial intelligence. In situations where more than one emoji character is embedded within the text source, the annotation identifier 222 may also select the emoji character associated with each potential annotation.

The annotation validator 224 may determine which potential annotations are valid. In some embodiments, potential annotations are scored for confidence or likelihood and the potential annotation with the highest score or all potential annotations above a selected threshold are determined to be valid. One of skill in the art will appreciate that a variety of scoring factors and scoring methods may be used for validity determination. In some embodiments, scoring is based on relevance or similarity to other portions of the text source and/or to existing annotations for an emoji character.

The context selector 226 may select one or more contexts that the validated annotation applies to. For example, in some situations a user profile may correlate to more than one language, geographic region or skill set. Various contexts may be associated with each language, geographic region, skill set or combination thereof. The usage monitor 228 may track a usage count or frequency of occurrence for annotations in each particular context.

The annotation list manager 230 manages annotation lists 240 corresponding to various contexts. Each annotation list may aggregate the potential meanings of an emoji character within a specific context. The modules of the depicted annotation list manager 230 include an annotation inserter 232, an annotation deleter 234, an annotation translator 236 and a list sorter 238.

The annotation inserter 232 may insert an annotation that is not currently in the annotation list of a specified context. In contrast, the annotation deleter 234 may delete a specified annotation from the annotation list of a specified context. The annotation translator 236 may translate an annotation from a source context to a target context. For example, the source and target context may correspond to differing languages, dialects, or socio-economic categories. Consequently, a translation of an annotation from the source context to a target context may be appropriate.

The list sorter 238 sorts the annotation lists in order of usage count or frequency. Keeping sorted lists may statistically reduce the average time required to find (match to) an annotation. Each annotation list 240 may correspond to a specific emoji character and context. In some embodiments, the annotation lists each comprise a list of annotation entries where each annotation entry is a data structure that comprises an annotation hashkey, a pointer to an annotation string, and an annotation count. One of skill in the art will appreciate that using hashkeys and string pointers may simplify the process of finding matching annotations.

Figure 3:
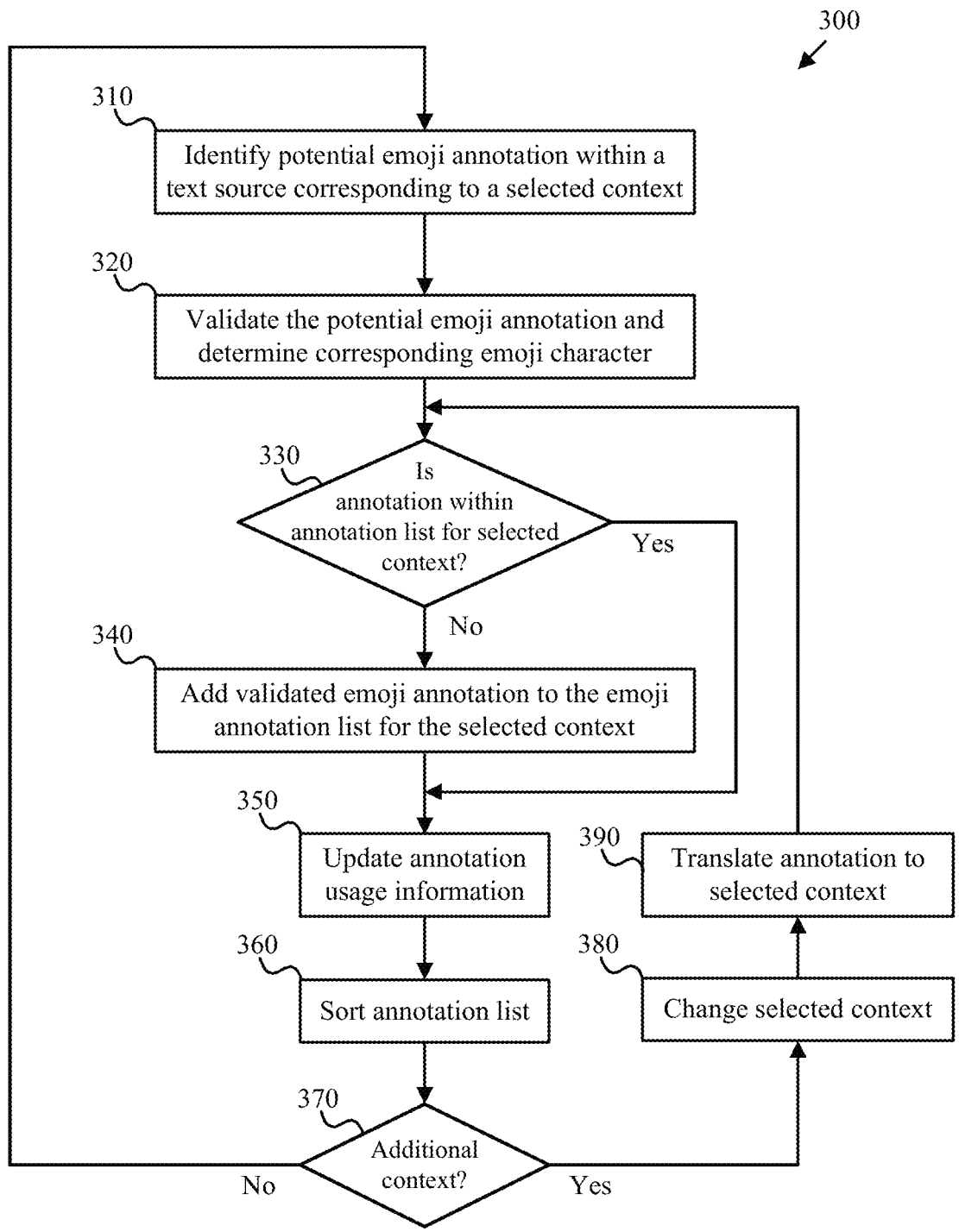
FIG. 3 is a flowchart of one example of an emoji annotation management method in accordance with at least one embodiment disclosed herein.

FIG. 3 is a flowchart of one example of an emoji annotation management method 300. As depicted, the emoji annotation management method 300 includes identifying (310) a potential emoji annotation, validating (320) the potential emoji annotation, determining (330) whether the annotation is within an annotation list for the selected context, adding (340) the emoji annotation to the annotation list, updating (350) annotation usage information, sorting (360) the annotation list, determining (370) whether an additional context exists, changing (380) the selected context and translating (390) the annotation to the new selected context. The emoji annotation management method 300 enables dynamically building emoji annotation lists for various contexts and may be conducted in conjunction with the emoji annotation tracking apparatus 200 or the like.

Identifying (310) a potential emoji annotation may include processing text provided by a source device or channel. The provided text may correspond to a selected context. One or more potential emoji annotations may be extracted or derived from the provided text. However, for purposes of simplicity and comprehension, a single potential emoji annotation is generally assumed herein. The selected context may correspond to one or more of a language, a dialect, a locale, a culture, a user skill, a user interest, a user affiliation and a geographic region. In some embodiments, the selected context is determined from the provided text. In other embodiments, the selected context is associated with one or more of the user, the source device and the communication channel.

Validating (320) the potential emoji annotation may include determining if a relevance score or some other type of analysis metric for a potential emoji annotation exceeds a selected threshold and determining the emoji character within the text message that corresponds to the annotation. Upon validation, the emoji annotation may be associated with the emoji character.

Determining (330) whether the emoji annotation is within an annotation list for the selected context may include searching an annotation list that corresponds to the emoji character and the selected context to determine if the annotation is already within the annotation list. If not, the method proceeds by adding (340) the annotation to the annotation list. If the annotation is already in the annotation list, the method skips to the updating operation 350.

Updating (350) annotation usage information may include incrementing a usage count for the annotation within the annotation list corresponding to the selected emoji character and context.

Sorting (360) the annotation list may include sorting the updated annotation list in usage order. In one embodiment, the updated usage count is compared with the usage count of preceding annotations within the annotation list. While the usage count is greater than preceding usage counts, the position of the annotation in the list is advanced toward the front of the list.

Determining (370) whether an additional context exists may include determining the similarity between the current selected context and other contexts. In some embodiments, the text processed in the identifying operation 310 is analyzed to ascertain if it matches another context. In certain embodiments, similarities between contexts are determined (e.g., in advance) from a corpus of training data of text-based communications that include emoji characters. If an additional context does not exist, the depicted method loops to the identifying operation 310 for additional processing of the same text-based communication or a subsequent communication. If an additional context does exist, the method proceeds by changing (380) the selected context to the additional context.

Subsequent to changing (380) the selected context, the depicted method 300 advances by translating (390) the annotation to the newly selected context. In certain embodiments a relevance score is assigned to the translated annotation based on the relevance score computed for the previous context (e.g., in step 330) and the similarity of previous context and the newly selected context. Subsequent to translation, the depicted method loops to the determining operation 330 to determine if the annotation should be added to an annotation list for the newly selected context.

One of skill of the art will appreciate that the presented emoji annotation management method 300 and other embodiments disclosed herein are presented by way of example and may be adapted as needed to specific applications and systems. Furthermore, for purposes of simplicity and comprehension, the various embodiments are presented at a high level and many implementation details familiar to, or available to, those of skill in the art may be needed for proper deployment in an actual working system.

Figure 4:
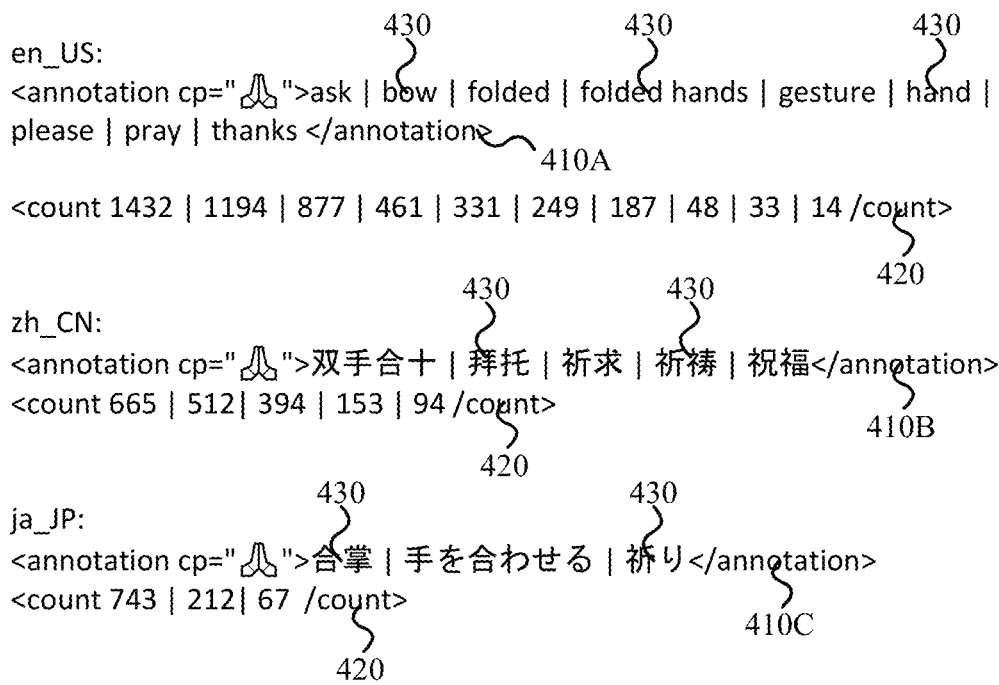
FIG. 4 is a text diagram of several examples of emoji annotation lists in accordance with at least one embodiment disclosed herein.

FIG. 4 is a text diagram of several examples of emoji annotation lists 410 in accordance with at least one embodiment disclosed herein. The depicted examples include a US English context list 410A, a Simplified Chinese context list 410B, and a Japanese context list 410C. In the depicted embodiment, an annotation count array 420 that corresponds to each annotation list 410 indicates the usage count of each of the annotations 430 within the annotation list. Although the depicted examples are for language-based and/or region-based contexts, the embodiments disclosed herein are not limited to language-based and/or region-based contexts.

One of skill in the art will appreciate that the various embodiments disclosed herein provide a variety of benefits including enabling dynamic management of annotations for as many contexts as desired. The management of the annotations may be entirely automated although human review and validation of the annotations (including user review) may be utilized as desired.

Figure 5A:
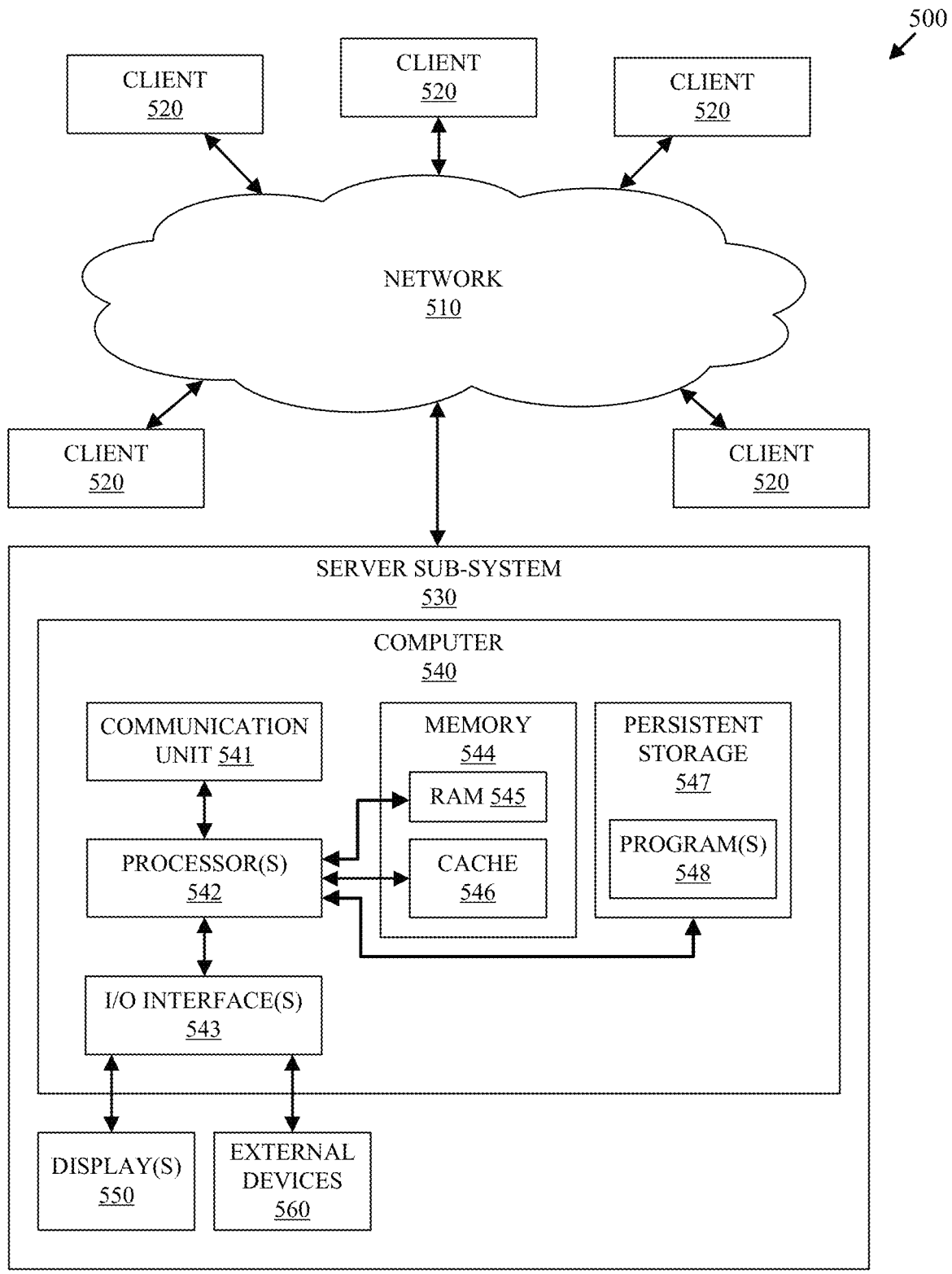
FIG. 5A is a block diagram illustrating various portions of a computing environment in accordance with at least one embodiment disclosed herein.

FIG. 5A is a block diagram illustrating various portions of a computing system 500 in accordance with at least one embodiment disclosed herein. As depicted, computing system 500 includes a communication network 510, one or more client devices 520 and at least one server subsystem 530. The depicted server subsystem 530 includes at least one computer 540 connected to one or more displays 550 and one or more external devices 550. The depicted computer 540 includes a communication unit 541, one or more processors 542, a set of I/O interfaces 543, memory 544 including random access (i.e, main) memory 545 and cache memory 546, and persistent storage 547 that stores one or more programs or executables 548.

Similar to the depicted subsystem 530, the clients 520 may comprise a computer 540. Subsystem 530 and computer 540 are, in many respects, representative of the subsystems and devices that can execute at least a portion of one or more methods disclosed herein. Accordingly, several portions of subsystem 530 and computer 540 will now be discussed in the following paragraphs.

Computer 540 may be a laptop computer, tablet computer, netbook computer, personal computer (PC), a desktop computer, a personal digital assistant (PDA), a smart phone, or any programmable electronic device capable of communicating via network 510. Each executable 548 is a collection of machine readable instructions and/or data that is used to perform at least some of the software functions discussed herein. For example, the methods describe herein may correspond to one or more executables 548.

Computer 540 is capable of communicating with other computing devices such as the clients 520 and other subsystems 530 via communication network 510. Communication network 510 can be, for example, a local area network (LAN), a wide area network (WAN) such as the Internet, or a combination of the two, and can include wired, wireless, or fiber optic connections. In general, communication network 510 can be any combination of connections and protocols that will support communications between computing devices such as the server subsystem and client subsystems.

Computer 540 is shown as a block diagram with many double arrows. These double arrows (no separate reference numerals) represent a communications fabric, which provides communications between various components of computer 540. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 544 and persistent storage 547 are computer readable storage media. In general, memory 544 can include any suitable volatile or non-volatile computer readable storage media. It is further noted that, now and/or in the near future: (i) external device(s) 560 may be able to supply, some or all, memory for subsystem 530; and/or (ii) devices external to subsystem 530 may be able to provide memory for subsystem 530.

The programs 548 are stored in persistent storage 547 for access and/or execution by one or more of the respective computer processors 542, usually through one or more memories of memory 544. Persistent storage 547: (i) is at least more persistent than a signal in transit; (ii) stores the programs (including its soft logic and/or data), on a tangible medium (such as magnetic or optical domains); and (iii) may be substantially less persistent than permanent storage.

Alternatively, data storage may be more persistent and/or permanent than the type of storage provided by persistent storage 547.

Programs 548 may include both machine readable and performable instructions, and/or substantive data (e.g., the type of data stored in a database). In one particular embodiment, persistent storage 547 includes a magnetic hard disk drive. To name some possible variations, persistent storage 547 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 547 may also be removable. For example, a removable hard drive may be used for persistent storage 547. Other examples include optical and magnetic disks, thumb drives, and smart cards that are inserted into a drive for transfer onto another computer readable storage medium that is also part of persistent storage 547.

Communications unit 541, in the depicted example, provides for communications with other data processing systems or devices external to subsystem 520. In these examples, communications unit 541 includes one or more network interface cards. Communications unit 541 may provide communications through the use of either, or both, physical and wireless communications links. Any software modules discussed herein may be downloaded to a persistent storage device (such as persistent storage device 560) through a communications unit (such as communications unit 541).

I/O interface set 543 allows for input and output of data with other devices that may be connected locally in data communication with computer 540. For example, I/O interface set 543 provides a connection to external device set 560. External device set 560 will typically include devices such as a keyboard, keypad, a touch screen, and/or some other suitable input device. External device set 560 can also include portable computer readable storage media such as, for example, thumb drives, portable optical or magnetic disks, and memory cards. Software and data used to practice embodiments of the present invention, for example, programs 548, can be stored on such portable computer readable storage media. In these embodiments the relevant software may (or may not) be loaded, in whole or in part, onto persistent storage device 560 via I/O interface set 543. I/O interface set 543 also connects in data communication with display device 550. Display device 550 provides a mechanism to display data to a user and may be, for example, a computer monitor or a smart phone display screen.

Figure 5B:
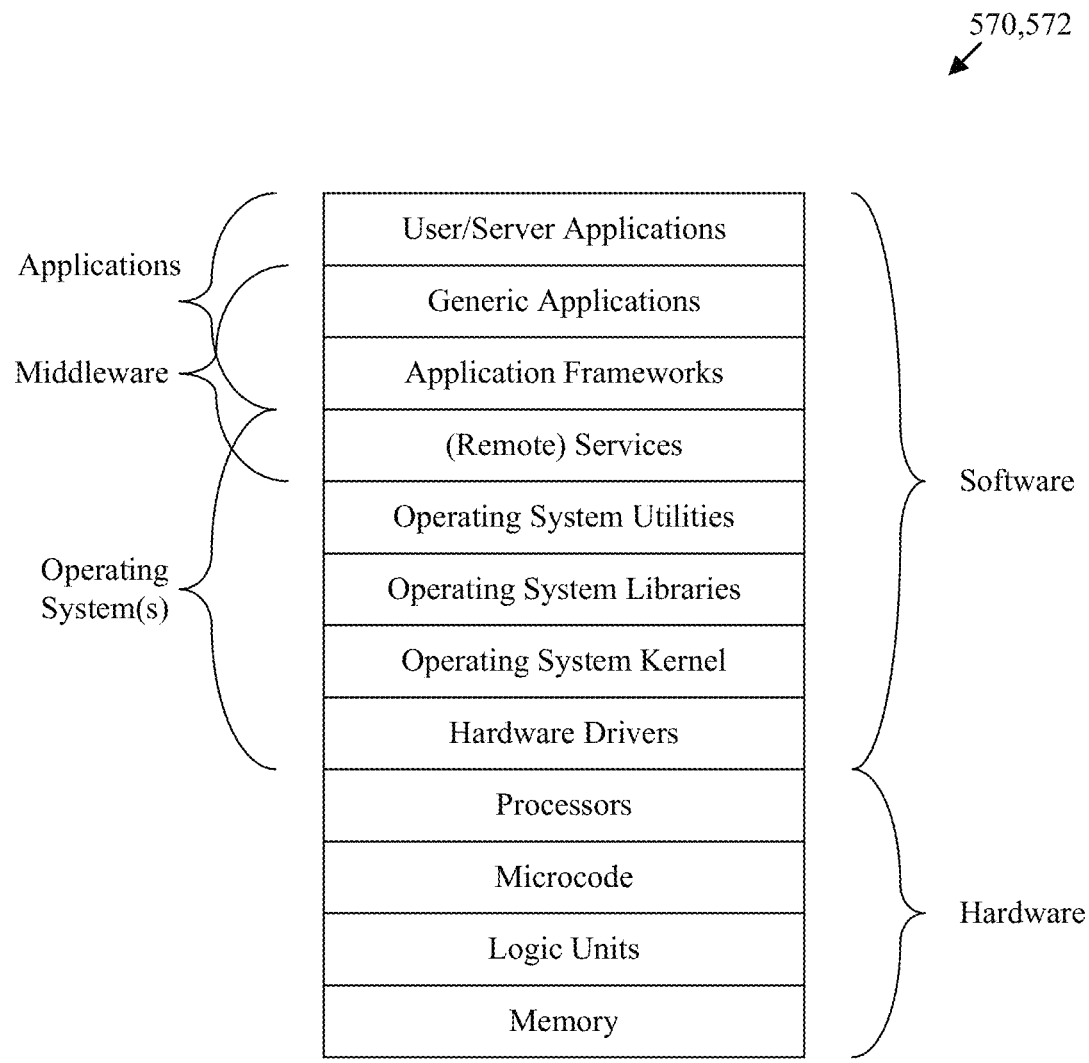
FIG. 5B is a block diagram illustrating one example of a computing stack in accordance with at least one embodiment disclosed herein.

FIG. 5B is a block diagram illustrating one example of a computing stack 570 in accordance with at least one embodiment disclosed herein. As depicted, the computing stack 570 includes a number of computing layers 572 used for conducting computing operations. In the depicted embodiment, the layers include hardware layers and software layers. The various software layers include operating system layers associated with executing one or more operating systems, middleware layers associated with executing middleware that expands and/or improves the functionality of hardware layers and executing operating system(s). The software layers may also include various application-specific layers. The application-specific layers may include application frameworks that further expand on, and/or improve upon, the functionality of hardware layers and operating system layers.

The memory layer may include volatile memory, non-volatile memory, persistent storage and hardware associated with controlling such memory. The logic units may include cpu's, arithmetic units, graphic processing units and hardware associated with controlling such units. The microcode layer may include executable instructions for controlling the processing flow associated with moving data between memory and the logic units. The processor layer may include instruction fetch units, instruction decode units, and the like that enable execution of processing instructions and utilization of the underlying hardware layers.

The hardware drivers (also known as the hardware abstraction layer) may include executable code that enables an operating system to access and control storage devices, DMA hardware, I/O buses, peripheral devices and other hardware associated with a computing environment. The operating system kernel layer may receive I/O requests from higher layers and manage memory and other hardware resources via the hardware drivers. The operating system kernel layer may also provide other functions such as inter-process communication and file management.

Operating system libraries and utilities may expand the functionality provided by the operating system kernel and provide an interface for accessing those functions. Libraries are typically leveraged by higher layers of software by linking library object code into higher level software executables. In contrast, operating system utilities are typically standalone executables that can be invoked via an operating system shell that receives commands from a user and/or a script file. Examples of operating system libraries include file I/O libraries, math libraries, memory management libraries, process control libraries, data access libraries and the like. Examples of operating system utilities include anti-virus managers, disk formatters, disk defragmentors, file compressors, data or file sorters, data archivers, memory testers, program installers, package managers, network utilities, system monitors, system profilers and the like.

Services are often provided by a running executable or process that receives local or remote requests from other processes or devices called clients. A computer running a service is often referred to as a server. Examples of servers database servers, file servers, mail servers, print servers, web servers, game servers, and application servers.

Application frameworks provide functionality that is commonly needed by applications and include system infrastructure frameworks, middleware integration, frameworks, enterprise application frameworks, graphical rendering frameworks, gaming frameworks. An application framework may support application development for a specific environment or industry. In some cases application frameworks are available for multiple operating systems and providing a common programming interface to developers across multiple platforms.

Generic applications include applications that are need by most users. Examples of generic applications include mail applications, calendaring and scheduling applications, and web browsers. Such applications may be automatically included with an operating system.

One of skill in the art will appreciate that an improvement to any of the depicted layers, or similar layers that are not depicted herein, results in an improvement to the computer itself including the computer 540 and/or the client devices 510. One of skill in the art will also appreciate that the depicted layers are given by way of example are not representative of all computing devices. Nevertheless, the concept of improving the computer itself by improving one or more functional layers is essentially universal.

The executables and programs described herein are identified based upon the application or software layer for which they are implemented in a specific embodiment of the present invention. However, it should be appreciated that any particular program nomenclature herein is used merely for convenience, and thus the present invention should not be limited to use solely in any specific identified application or software layer.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically building an emoji annotation list, the method comprising:
   determining a context for a particular emoji character within a text source;
   identifying a potential emoji annotation for the determined context within the text source, wherein the potential emoji annotation comprises text in a language associated with the determined context;
   determining a matching emoji character within an annotation list that corresponds to the potential emoji annotation to produce a validated emoji annotation for the matching emoji character, wherein:
      the matching emoji character matches the particular emoji character based on the determined context, and
      the validated emoji annotation comprises a text-based description of the matching emoji character;
   determining whether the validated emoji annotation for the matching emoji character is within an emoji annotation list for the determined context; and
   adding the validated emoji annotation for the matching emoji character to the emoji annotation list for the determined context responsive to determining that the validated emoji annotation for the matching emoji character is not within the emoji annotation list for the determined context,
   wherein the emoji annotation list for the determined context associates the validated emoji annotation with the matching emoji character.

2. The method of claim 1, wherein the determined context corresponds to one or more of the language, a dialect, a locale, a culture, a user profile, a user affiliation, and a geographic region.

3. The method of claim 1, further comprising tracking usage of entries within the emoji annotation list to produce annotation usage information.

4. The method of claim 3, further comprising sorting the emoji annotation list according to the annotation usage information.

5. The method of claim 1, further comprising translating the text of the validated emoji annotation for the matching emoji character to a different language.

6. A computer program product for dynamically building an emoji annotation list, the computer program product comprising a computer readable storage medium having program instructions embodied therewith, wherein the computer readable storage medium is not a transitory signal per se, the program instructions executable by a processor to cause the processor to conduct a method comprising:
   determining a context for a particular emoji character within a text source;
   identifying a potential emoji annotation for the determined context within the text source, wherein the potential emoji annotation comprises text in a language associated with the determined context;
   determining a matching emoji character within an annotation list that corresponds to the potential emoji annotation to produce a validated emoji annotation for the matching emoji character, wherein:
      the matching emoji character matches the particular emoji character based on the determined context, and
      the validated emoji annotation comprises a text-based description of the matching emoji character;
   determining whether the validated emoji annotation for the matching emoji character is within an emoji annotation list for the determined context; and
   adding the validated emoji annotation for the matching emoji character to the emoji annotation list for the determined context responsive to determining that the validated emoji annotation for the matching emoji character is not within the emoji annotation list for the determined context,
   wherein the emoji annotation list for the determined context associates the validated emoji annotation with the matching emoji character.

7. The computer program product of claim 6, wherein the determined context corresponds to one or more of the language, a locale, a culture, a user profile, a user affiliation, and a geographic region.

8. The computer program product of claim 6, wherein the method further comprises tracking usage of entries within the emoji annotation list to produce annotation usage information.

9. The computer program product of claim 8, wherein the method further comprises sorting the emoji annotation list according to the annotation usage information.

10. The computer program product of claim 6, wherein the method further comprises translating the text of the validated emoji annotation to a different language.

11. A method for dynamically building an emoji annotation list, the method comprising:
- adding a first emoji annotation to a particular emoji character, the first emoji annotation comprising a first text-based description of the particular emoji character;
- adding the first emoji annotation to a first emoji annotation list corresponding to a first context associated with the first language, wherein:
  - the first text-based description is written in a first language, and
  - the first emoji annotation list corresponds to the first context and associates the first emoji annotation written in the first language with the first context of the particular emoji character;
- translating the first emoji annotation written in the first language to a second emoji annotation written in a second language to produce the second emoji annotation written in the second language for the particular emoji character in response to determining a change in context from the first context to a second context associated with the second language for the particular emoji character; and
- adding the second emoji annotation written in the second language to a second emoji annotation list corresponding to the second context associated with the second language, wherein:
- the second emoji annotation comprises a second text-based description of the particular emoji character,
- the second text-based description is written in the second language, and
- the second emoji annotation list corresponds to the second context and associates the second emoji annotation written in the second language with the second context of the particular emoji character.

12. The method of claim 11, further comprising tracking usage of entries within the first emoji annotation list corresponding to the first language to produce annotation usage information.

13. The method of claim 12, further comprising sorting the first emoji annotation list according to the annotation usage information.

14. The method of claim 11, further comprising translating the first emoji annotation written in the first language to a third emoji annotation written in a third language.

15. The method of claim 11, further comprising determining whether the first emoji annotation written in the first language is within the first emoji annotation list for the first language.

\* \* \* \* \*